(12) United States Patent
Vu

(10) Patent No.: US 6,940,856 B2
(45) Date of Patent: Sep. 6, 2005

(54) MULTICAST BUFFERED SWITCH AND METHOD FOR OPERATING A MULTICAST BUFFERED SWITCH

(75) Inventor: Chien Dinh Vu, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 752 days.

(21) Appl. No.: 09/799,854

(22) Filed: Mar. 5, 2001

(65) Prior Publication Data

US 2004/0202162 A1 Oct. 14, 2004

(51) Int. Cl.[7] .......................... H04L 12/28; H04L 12/56
(52) U.S. Cl. ...................... 370/390; 370/362; 370/364
(58) Field of Search ................................ 370/124, 489,
370/427, 398, 387, 388, 390, 389, 351,
360, 362, 363, 364, 365, 366, 471, 412,
413, 419, 420, 395.1, 396, 400, 421–423,
440, 438, 67, 85.9, 85.13, 85.1

(56) References Cited

U.S. PATENT DOCUMENTS

| | | | | |
|---|---|---|---|---|
| 5,548,588 A | * | 8/1996 | Ganmukhi et al. | 370/395.7 |
| 5,666,361 A | | 9/1997 | Aznar et al. | 370/392 |
| 5,689,505 A | * | 11/1997 | Chiussi et al. | 370/388 |
| 5,689,506 A | * | 11/1997 | Chiussi et al. | 370/388 |
| 5,701,300 A | | 12/1997 | Jeon et al. | 370/392 |
| 5,748,905 A | | 5/1998 | Hauser et al. | 395/200.79 |
| 5,852,607 A | | 12/1998 | Chin | 370/401 |
| 5,856,977 A | * | 1/1999 | Yang et al. | 370/395.72 |
| 5,898,669 A | | 4/1999 | Shimony et al. | 370/232 |
| 5,917,819 A | | 6/1999 | Yang et al. | 370/390 |
| 5,936,959 A | | 8/1999 | Joffe | 370/397 |
| 6,101,187 A | | 8/2000 | Cukier et al. | 370/396 |
| 6,108,335 A | * | 8/2000 | Ganmukhi et al. | 370/395.7 |
| 6,118,792 A | * | 9/2000 | Beshai | 370/468 |
| 6,122,279 A | * | 9/2000 | Milway et al. | 370/395.32 |
| 6,188,690 B1 | * | 2/2001 | Holden et al. | 370/390 |
| 6,289,021 B1 | * | 9/2001 | Hesse | 370/409 |
| 6,345,050 B1 | * | 2/2002 | Alleyne et al. | 370/389 |
| 6,396,809 B1 | * | 5/2002 | Holden et al. | 370/236 |
| 6,445,705 B1 | * | 9/2002 | Holden et al. | 370/394 |
| 6,449,274 B1 | * | 9/2002 | Holden et al. | 370/392 |
| 6,487,213 B1 | * | 11/2002 | Chao | 370/418 |
| 6,724,779 B1 | * | 4/2004 | Alleyne et al. | 370/517 |

OTHER PUBLICATIONS

IBM Technical Disclosure Bulletin, vol. 38, No. 07, Jul. 1995, p. 159, "Copy Function for Asynchronous Transfer Model Swap".

IBM Technical Disclosure Bulletin, vol. 37, No. 04B, Apr. 1994, pp. 415–417, Asynchronous Transfer Mode Cell Routing.

* cited by examiner

Primary Examiner—Wellington Chin
Assistant Examiner—Jamal A. Fox
(74) Attorney, Agent, or Firm—Jocelyn G. Cockburn

(57) ABSTRACT

In an NXN switch a plurality of buses interconnect the individual input modules to all of the output modules in a predetermined sequence. The input modules store the received cells and a unique ID. When selected the input module places a cell and its ID on selected ones of the buses along with a multicast vector which identities which of the output modules is to process the cell on a bus. The output modules examine the multicast vector and process the cell (table lookup) if selected In the multicast vector. If an output module is unable to process a required cell (successful table lockup) it sets a retry vector resident on the bus and the input module modifies the multicast vector to indicate only those output module(s) which failed to process a required cell. The cell, the ID and the modified multicast vector are placed on a bus in a subsequent selection of that input module.

36 Claims, 4 Drawing Sheets

MULTICAST BUFFERED SWITCH AND METHOD FOR OPERATING A MULTICAST BUFFERED SWITCH

FIELD OF THE INVENTION

The invention relates to digital switches such as ATM switches in general and more particularly to digital switches which handle both unicast and multicast data cells or packets and a method for operating such a switch.

BACKGROUND

Relaying incoming traffic from an input to an output is a classic switch function. Traditional switches typically support unicast traffic only. In order to support multicast traffic, switches often employ at least two stages:

1) traffic replication, and
2) traffic relaying.

In an ATM switch for example, the protocol requires that a cell enters a hop with a header specifically assigned for the cell's connection over that hop and that the outgoing header is provided by a switch employing a cell header swapping function. To support multicast ATM traffic, ATM switch designers simply added a cell replication stage to the early unicast switch structure. Hence, unicast ATM switch architectures modified to accommodate multicast traffic often employ a three-stage switch (1. cell replication, 2. cell relaying and 3. cell header swapping).

To facilitate the relaying function, a switch employs an addressing scheme with an explicit internal routing tag; also referred to as a label. Such an addressing scheme requires additional circuitry to encode a routing tag into an arriving cell, to decode the routing tag for relaying purposes and then to remove the routing tag after relaying the cell. The encoding function is primarily based on table lookup. In addition to the encoding routing function, switch designers also assign the replication function to the switch input. The table lookup at the entrance of a switch also provides the traffic filter function and encodes additional information for the cell replication function. These switches often consists of two paths: one for unicast traffic and another for multicast traffic. The unicast traffic cuts-though the replication circuitry but not the multicast. The replication circuitry relies on the multicast information in the label encoded by the input to replicate the multicast cell/packet and may require its own lookup table. Since each copy of a multicast cell leaves a switch with its own header cell, the cell header must be swapped after the cell is relayed. The header swapping function requires another layer of lookup tables. In short, an ATM switch consists of at least two layers of lookup tables: one at the input and another at the output. Depending on the complexity of a switch, it may require three or more layers of lookup tables.

SUMMARY OF THE INVENTION

The invention contemplates a multicast buffered switch which includes a plurality of Input modules each connected to a different one of a plurality of input lines over which transmission cells each including a payload are received, a plurality of output modules each connected to a different output line and a multiconductor bus for interconnecting the input and output modules. The input module receives cells and stores each of the received cells. Periodically a stored cell and control information are placed on the bus. The output modules receives the bus contents and compares portions of the contents of the bus to stored routing information. If the routing information stored in the output module compares, the cell is queued for transmission over its connected output.

An object of the invention is to reduce the complexity of multicast buffered switches.

Another object of the invention is reduce the number of table lookups required in a multicast buffered switch.

DETAILED DESCRIPTION OF THE INVENTION

The multicast buffered ATM switch, hereafter MBAS, is a single-stage switch in which all three functions (cell replication, cell relaying and header swapping) are executed concurrently. The MBAS utilizes the cell header as its unique addressing scheme (referred to as implicit routing-tag scheme). In an MBAS switch, all cells are served as multicast cells and each output has to filter and to copy its own cells. While a cell is copied into an output queue, the cell header is concurrently swapped. With this switching mechanism, the MBAS employs only a single layer of lookup tables.

Figure 1:
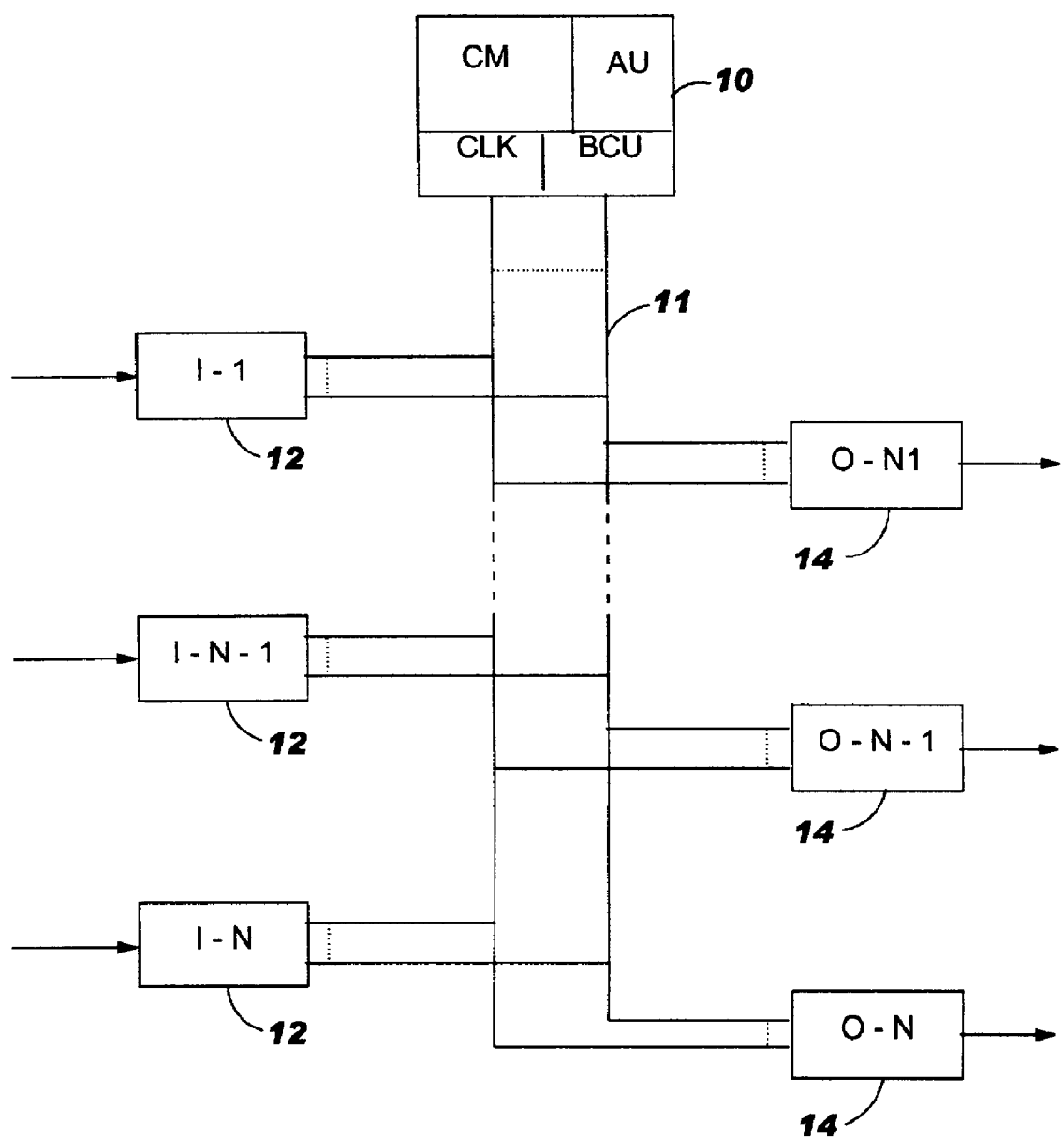
FIG. 1 is a block diagram of an N×N digital switch constructed according to the invention.

The MBAS switch illustrated in FIG. 1 includes a control module 10. Control module 10 has an arbitration unit and a master clock which are distributed via a master bus 11 under control of an internal bus control unit. Master bus 11 also has a data or payload bus, a header bus, a multicast bus and a retry bus. N identical input modules 12 connect N input lines to the bus 11. N identical output modules 14 are connected to the bus 11 and selectively transmit cells received over the bus 11 to connected output lines.

Figure 2:
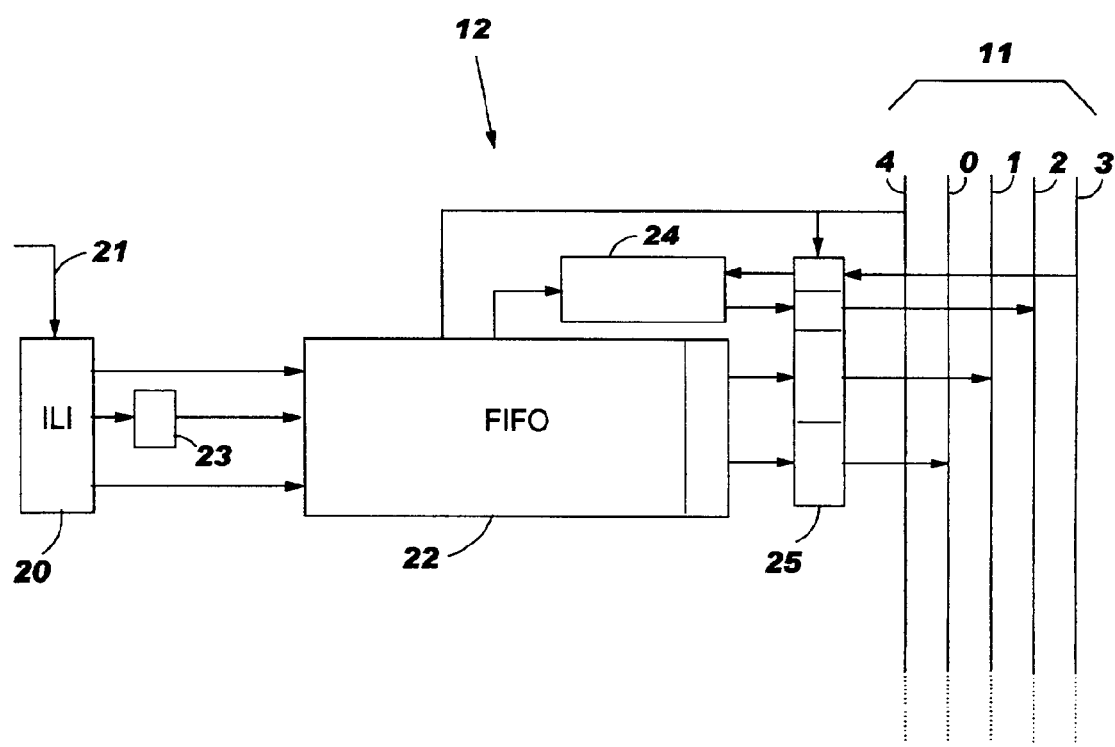
FIG. 2 is a block diagram of a single input port and common circuitry which is used by all of the input ports.

FIG. 2 is a detailed block diagram of one of the N identical input modules 12. The module includes an input line interface 20 which receives ATM cells from an input line 21. Interface 20 checks the cell header for errors. If none are detected or can be corrected, the interface strips the header error correction (HEC) byte from the cell and adds a unique identification byte (ID) representing its own address in place of the HEC byte. It loads the ID byte stored in a register 23 and the remainder of the received cell (including the VPI/VCI fields and the payload) into a FIFO buffer 22. A multicast control signal or vector stored in a register 24 includes N bits, one assigned to each of the N output modules 14. Register 24 is set to a predetermined state, such as all ones, each time FIFO buffer 22 advances a stored cell to the Head Of Line (HOL) position. The assigned bits on the multicast bus indicate to the respective output units that they have a cell to process. How this is accomplished will become apparent below in connection with the description of FIG. 3.

A gate module 25 under control of the arbitration and clock units provided over a bus 4 of master bus 11, connects FIFO 22 and register 24 to their respective multiconductor busses 0–3 of master bus 11. Two bus cycles are utilized to transfer a cell from an input to the outputs. In the first cycle the header and the multicast vector are transmitted via their sub-busses. The payload and the retry vector are transmitted in the very next bus cycle along with the header and multicast vector for a cell from the next input in the arbitration scheme.

The cell payload is connected to multiconductor bus 0; the five byte cell header which now includes the unique input port ID (in place of the HEC byte) is connected to multiconductor bus 1; the contents of multicast register 24 are connected to multiconductor bus 2; and, a multiconductor retry bus 3, which is loaded by the output units 14, is also connected to multicast register 24 and used by the logic controlling register 24 to modify the contents of the register and the multicast control bus 2 to reflect the successful transmission of the forwarded cells at the output modules 14.

Figure 3:
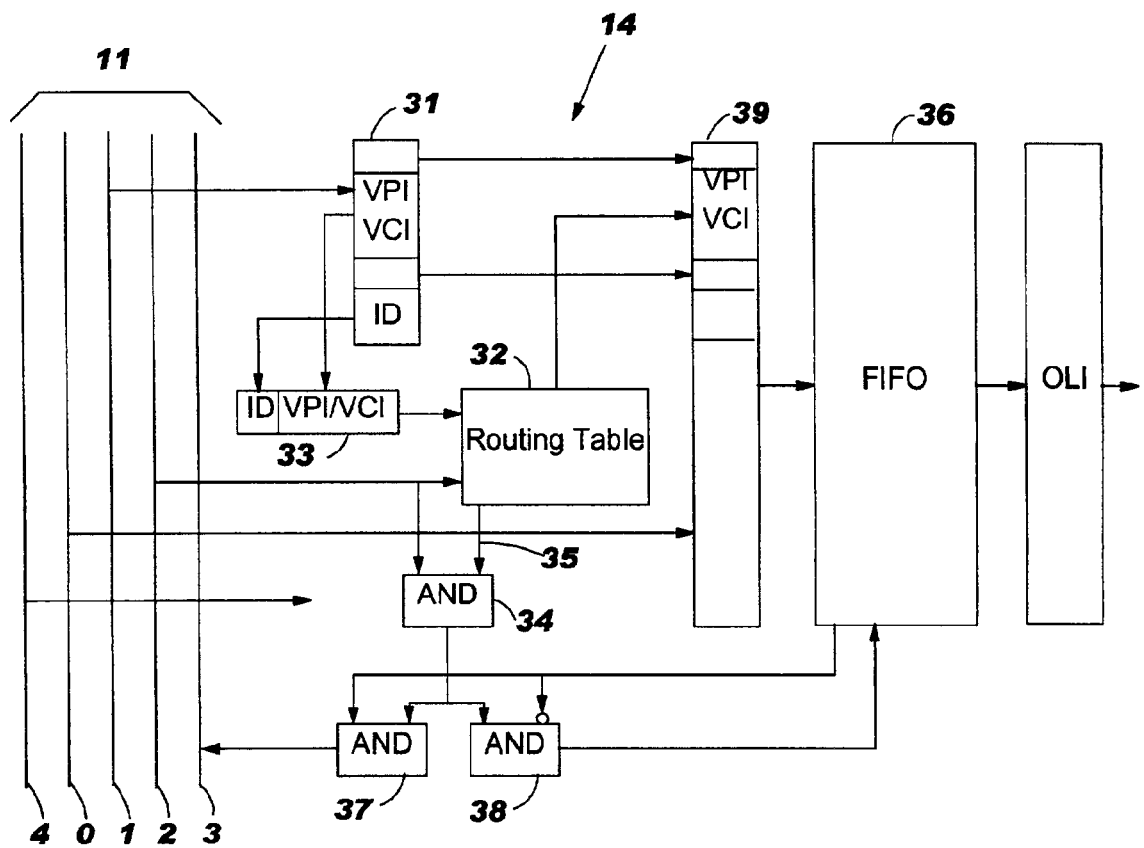
FIG. 3 is a block diagram of a single output port and common circuitry which is used by all of the output ports; and, FIG. 4 is a detailed block diagram of a component included in FIG. 3.
Figure 4:
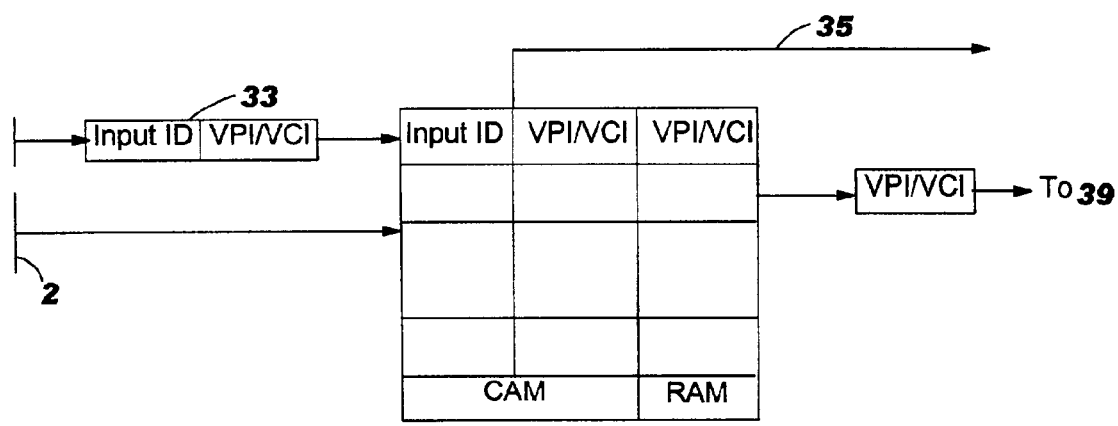

The output module 14 illustrated in FIG. 3 operates as a two-stage pipeline under control of the control module 10 which provides a global clock for updating routing tables, receiving and processing cells. The global clock is used to synchronize operations of all entities. The first stage includes cell header and multicast bit reception and a table lookup. At the beginning of a bus or relay cycle or period, if the enable bit (the bit in the multicast bus 2 assigned to the output unit) is set, the routing table performs a single-cycle-memory lookup function and provides a match bit when the cell identified by the ID, VPI and VCI in the received header are found in the routing table. If the match bit is set, an outgoing VPI/VCI (and a QoS bitmap vector if used) are retrieved concurrently with the arrival of the cell payload. If a write-enable bit (described below) is set, the whole cell with its outgoing VPI/VCI is then written into the output buffer.

During the first stage the contents of the five byte header bus 1 are loaded into a register 31. The VPI/VCI and ID fields are applied to a look up table 32 via a controller 33. If the bit assigned to this output unit in the multicast bus 2 is in the enable (set) state, a table lookup is performed on the ID, VPI/VCI fields by controller 33. An enabled multicast bit conditions an AND gate 34 which provides an output if the routing table signals a match on conductor 35. An output FIFO buffer 36 provides an output bit when it is full and cannot accept an additional cell. A pair of AND gates 37 and 38 receive the output bit from buffer 36 along with the output of AND gate 34. If FIFO buffer 36 is full AND gate 37 will set its bit in the retry vector on bus 3. If the buffer 36 is not full AND gate 38 will provide a write enable output bit to the buffer 36.

During the second stage (which takes place during a subsequent cycle of bus 11), the payload on bus 0, the VPI/VCI for the outgoing cell from the routing table and those parts of the incoming cell which do not change (GFC, PT and CLP) stored in register 31 are loaded into an input register 39. If FIFO buffer 36 receives a write enable from AND gate 38 the contents of register 39 are stored during the second stage. The cells stored in FIFO buffer 36 are transmitted in sequence by an output line interface 40. If any output sends a retry bit over bus 3, the input module will resend the cell, however the multicast vector will be modified to enable only those output modules requesting a retry.

An NxN Multicast Buffered ATM Switch includes a switch fabric connecting N inputs to N outputs. The primary functions of an input are two-fold: 1) to recover the digital bit stream, and 2) to stamp a unique input ID into each incoming cell. An output has two primary functions: 1) to selectively receive cells from the bus, and 2) to retransmit outgoing cells. The primary objective of the switching fabric is to relay incoming cells from the inputs to the outputs.

In the NxN MBAS switch, the switch fabric is a bus system and includes a bus control unit, a set of unidirectional buses including 1) a N-bit feedback retry bus, 2) a N-bit multicast bus, 3) a 5-byte header bus, and 4) a 48-byte payload bus. Input and output ports are connected to the buses in parallel. The header, multicast, and payload buses transmit the ATM cell header, the multicast vector, and the ATM cell payload, respectively. To maximize pipeline speed, the bus arbitration has to achieve zero switch-over time. Thus, the bus control logic has to arbitrate for the next input while the bus transfers the cell header of the current input and the cell payload for the previous input. This calls for a simple bus-arbitration scheme such as time division, round-robin, etc. Furthermore, bus arbitration is done for the header bus only. The input that currently controls the header bus also inherits the multicast bus in the same bus slot and the payload bus in the next bus slot. Each output port is assigned a unique bit in the multicast vector and also in the retry vector. A unique assigned bit of a multicast vector enables the output filtering function, while an associated bit in the retry vector is used to request a retry after the output detects its cell but has no buffer for reception. An output returns its retry bit off if its enable bit is off or the cell is not addressed to it. Hence, a retry vector is an ack of a multicast vector upon completion of a cell filtering.

In the NxN MBAS switch, each input includes an input-link interface (ILI), a FIFO buffer, and a N-bit multicast register in which each bit is assigned to a specific output and is referred to as the output's enable bit. The ILI recovers the digital bit stream, performs cell delineation, cell rate decoupling, and error detection using HEC. A hardwired logic replaces an incoming cell's HEC field by the input ID while the cell is being stored in the input buffer. An input cell's relay logic is a two-stage pipeline: a cell-header stage and a payload stage. The multicast vector is transmitted simultaneously with the header of the head-of-line (HOL) cell. The multicast register is set when a cell becomes the HOL cell, and its content is updated by a retry vector at the end of a relay cycle. After being updated, if the multicast register is reset, the HOL cell is removed from the input queue. The head register is updated at that time if the FIFO 22 is not empty and all bits of the multicast register are then set to start another cell transfer cycle. Otherwise, the multicast register remains reset.

Each output module includes a cell-admission logic with its routing table, a FIFO buffer queue, and an output link interface (OLI) circuitry. The routing table employs two types of memory: a content-addressable memory module (CAM, also called associative memory) and a random-access memory module (RAM). The CAM stores the incoming portion of the routing table in two columns: input ID and VPI/VCI. The RAM section stores the corresponding outgoing portion of the routing table, which has the outgoing VPI/VCI. The CAM allows single-cycle lookup in its table using access keys, each having an input ID and a cell's VPI/VCI. A lookup is performed only when the output's enable bit is set. The default state of the match bit is reset. It is only set when the enable bit is set, and a match is found. Upon the assertion of the match bit, the RAM delivers the outgoing VPI/VCI. An output queue is enabled by the write-enable bit and provides a full bit which is set when the queue becomes full. There are two sets of AND logic:

a) the first set is a logical AND of the write-request bit and the full bit. The output of this AND logic is referred to as retry bit.

b) the second set is a logical AND of the write-request bit and the inverse of the fill bit. The output of this AND logic is referred to as write-enable bit.

An OLI is able to retransmit a cell from an output queue per cell slot.

An output's cell admission logic is a two-stage pipeline: a table lookup stage and a cell-reception stage. At the beginning of a relay cycle, if the enable bit is set, the routing table performs its single-cycle-memory lookup function and produces a match bit if a match is found. If the match bit is set, a corresponding outgoing VCI/VPI is retrieved; concurrently with the arrival of the cell payload. If the write-enable bit is set, the whole cell with its outgoing VPI/VCI is then written into the output FIFO buffer. Thus, the two-stage arrangement allows an output to selectively turn off its second stage or the whole pipeline.

The invention has been described above in conjunction with a two stage process in which a cell transfer spans two adjacent bus cycles or periods and in which the transfer rate or throughput averages one bus period per cell since two cells transfer over two adjacent bus periods. The described two stage process is more efficient than a single stage process and is the preferred embodiment. However, the invention is suitable for use in a single stage process in which a complete cell would be transferrd in one bus cycle or period. While such an arrangement is not as efficient it could be used in some situations.

The invention has also been described and illustrated in a single QoS switch, however, it is suitable for use in a multi-class QoS switch. To support multi-class of QoS, the FIFO of each output is partitioned into multiple queues; one per class of QoS. A QoS column is then added in the RAM section of the routing table. Each QoS row is a bitmap vector in which each QoS class is preassigned a bit and in which there is only one bit set per QoS bitmap. A bit in a QoS bitmap is referred to as queue-enable bit and is used to enable its corresponding queue for enqueueing a cell. There are two sets of AND logics per queue:

a) the first set is a logical AND of a write-request bit and each individual pair of a queue-enable bit and its full bit. The output of this AND logic is referred to as retry-request bit;

b) the second set is a logical AND of the write-request bit and each individual pair of a queue enable and the inverse of its full bit. The output of this AND logic is referred to as write-enable bit.

All retry bits constitutes the retry vector. An OLI is able to retransmit a cell from one of its QoS queues per cell slot.

In the MBAS switch, the output is the master and its input is the slave. The input has no role in how a cell is going to be switched. An MBAS switch does not have any concern that an incoming cell is a unicast cell or multicast cell. If an output successfully filters a cell, it copies the cell and swaps the cell header concurrently. The cell is then ready for retransmission.

The foregoing is illustrative of the present invention and is not to be construed as limiting the invention. While several embodiments of this invention have been described in detail, those skilled in this art will readily appreciate that many modifications are possible without materially departing from the novel teachings and advantages of this invention. Accordingly, all such modifications are intended to be included within the scope of this invention as defined by the claims. In the claims, means-plus-function clauses are intended to cover the structures described herein as performing the recited function and structural functional equivalents thereof. Therefore, it is to be understood that the foregoing is illustrative of the present invention and is not to be construed as limited to the specific embodiments disclosed, and that modifications to the disclosed embodiments, as well as other embodiments, are intended to be included within the scope of the claims appended hereto.

I claim:

1. A multicast buffered switch comprising:
   plurality of separate buses;
   a plurality of input modules each connected between a different one of a plurality of input lines, over which transmission cells including a payload are received;
   a common controller coupled to the plurality of buses and managing the plurality of buses in such a way that control information and a received cell inserted by an input module is sequentially transmitted on different ones of the plurality of separate buses; and
   a plurality of output modules each connected to a different output line and the plurality of separate buses for receiving a bus contents and comparing portions thereof to stored routing information to determine if the cell payload is to be retransmitted over its connected output line.

2. A multicast buffered switch as set forth in claim 1 in which the control information includes unique information identifying the input module which placed the cell and control information on the bus.

3. A multicast buffered switch comprising:
   a multiconductor bus;
   a plurality of input modules each connected between a different one of a plurality of input lines, over which transmission cells including a payload are received, and the multiconductor bus for sequentially transferring, a received cell and control information inserted by the input module, to the bus; and,
   a plurality of output modules each connected to a different output line and the multiconductor bus for receiving the bus contents and comparing portions thereof to stored routing information to determine if the cell payload is to be retransmitted over its connected output line wherein said control information includes unique information identifying the input module which placed the cell and control information on the bus and a multicast vector identifying which of the output modules are required to process the cell on the bus.

4. A multicast buffered switch as set forth in claim 3 in which the multicast vector identifies all of the output modules the first time an input module places a cell on the bus.

5. A multicast buffered switch as set forth in claim 3 in which each of the output modules sets a unique assigned position in a retry vector resident on the bus for indicating the successful processing of a cell received on the bus.

6. A multicast buffered switch as set forth in claim 5 in which a selected input module examines the retry vector to determine if any output modules failed to successfully process a cell, modifies the multicast vector to indicate only those output modules which failed to successfully process the cell and retransmits the cell with the modified retry vector when the input module is selected at a subsequent time and discards the cell if no output modules indicate a failure to process the cell.

7. A multicast buffered switch comprising:
   a plurality of input modules each connected to an input line over which transmission cells including a payload are received;
   a plurality of output modules each connected to an output line over which selected cells received at the input modules are to be transmitted;

a multiconductor bus interconnecting the input and output modules;

each of the input modules including a first means for storing received cells, a second means for placing, in a predetermined sequence, a received transmission cell, an ID identifying the input module and a multicast vector which includes an indicia indicating to each of the outputs when a transmission cell requires processing on the multiconductor bus; and, each of the output modules includes means for examining the multicast vector to determine if the output module is to process the cell on the bus and comparing selected portions of the bus contents including the ID placed on the multiconductor bus by the input modules to stored routing information for determining if the cell being processed is to be retransmitted by the output module over its connected output.

8. A multicast buffered switch as set forth in claim 7 in which the multicast vector identifies all of the output modules the first time an input module places a specific cell on the bus.

9. A multicast buffered switch as set forth in claim 8 in which each of the output modules includes a second means for setting a unique assigned position in a retry vector resident on the bus for indicating the successful processing of a cell received on the bus.

10. A multicast buffered switch as set forth in claim 9 in which a selected input module includes a third means for examining the retry vector to determine if any output modules failed to successfully process a specific cell, modifies the multicast vector to indicate only those output modules which failed to successfully process the specific cell and retransmits the specific cell, the input modules ID and the modified retry vector when the input module is selected at a subsequent time and discards the cell if no output modules indicate a failure to process the cell.

11. A multicast buffered switch comprising:

a plurality of input modules each connected to an input line over which transmission cells including data are received;

a plurality of output modules each connected to an output line over which selected cells received at the input modules are to be transmitted;

a multiconductor bus interconnecting the input and output modules;

each of the input modules including first means responsive to a unique selection signal on the bus for placing on the bus a received transmission cell, an ID identifying the input module and a multicast vector which includes an indicia for indicating to each of the output modules when a transmission cell on the multiconductor bus requires processing;

each of the output modules including means responsive to the multicast vector for comparing selected portions of the transmission cell and the ID placed on the multiconductor bus by the input modules to stored routing information for determining if the cell is to be transmitted by the output module over its connected output, queuing the cell for transmission over the connected output and setting a unique assigned position in a retry vector resident on the bus for indicating the successful or unsuccessful processing of a cell received on the bus; and, each selected input module including second means for examining the retry vector to determine if any output modules failed to successfully process a specific cell, for modifying the multicast vector to indicate only those output modules which failed to successfully process the specific cell and for retransmitting the specific cell, the input modules ID and the modified retry vector when the input module is selected at a subsequent time.

12. In a multicast buffered switch which includes a plurality of input modules each connected to a different one of a plurality of input lines over which transmission cells each including a payload are received, a plurality of output modules each connected to a different output line a method for operating the switch including:

providing a single stage switching system including a plurality of independent buses for interconnecting components of said switch;

at the input module, receiving cells and storing each of the received cells and periodically placing a stored cell on a selected one of the plurality of buses and control information on another of the plurality buses wherein the control information and the stored cell are being placed sequentially on respective buses; and at each output module, receiving the control information, comparing portions of the control information to stored routing information and queuing the received cell for transmission over its connected output when there is a successful comparison.

13. The method set forth in claim 12 in which the control information includes unique information identifying the input module which placed the cell and control information on the bus.

14. In a multicast buffered switch which includes a plurality of input modules each connected to a different one of a plurality of input lines over which transmission cells each including a payload are received, a plurality of output modules each connected to a different output line and a multiconductor bus for interconnecting the input and output modules a method for operating the switch including the following steps;

at the input module receiving cells and storing each of the received cells and periodically placing a stored cell and control information on the bus; and at each output module receiving the bus contents, comparing portions of the contents to stored routing information and queuing the received cell for transmission over its connected output when there is a successful comparison, wherein the control information includes unique information identifying the input module which placed the cell and control information on the bus and a multicast vector identifying which of the output modules are required to process the cell on the bus.

15. The method set forth in claim 14 in which the multicast vector identifies all of the output modules the first time an input module places a cell on the bus.

16. The method set forth in claim 14 in which each of the output modules sets a unique assigned position in a retry vector resident on the bus for indicating the successful processing of a cell received on the bus.

17. The method set forth in claim 16 in which a selected input module examines the retry vector to determine if any output modules failed to successfully process a cell, modifies the multicast vector to indicate only those output modules which failed to successfully process the cell, retransmits the cell with the modified multicast vector when the input module is selected at a subsequent time and discards the cell if no output module indicates a failure to process the cell.

18. In a multicast buffered switch which includes a plurality of input modules each connected to an input line over which transmission cells including data are received, a plurality of output modules each connected to an output line over which selected cells received at the input modules are to be retransmitted, and a multiconductor bus interconnecting the input and output modules a method of operating the switch including the following steps:

selecting each of the input modules in a predetermined sequence, placing a received transmission cell, an ID identifying the input module and a multicast vector which includes an indicia indicating to each of the outputs when a transmission cell on the multiconductor bus requires processing; and, at each of the output modules examining the multicast vector to determine if the cell is to be processed, comparing selected portions of the transmission cell and the ID placed on the multiconductor bus by the input modules to stored routing information to determining if the cell is to be transmitted by the output module over its connected output.

19. The method set forth in claim 18 in which the multicast vector identifies all of the output modules the first time an input module places a specific cell on the bus.

20. The method set forth in claim 19 in which at each of the output modules a unique assigned bit position in a retry vector resident on the bus is set to indicate the successful processing of a cell received on the bus.

21. The method set forth in claim 20 in which at a selected input module the retry vector is examined to determine if any output modules failed to successfully process a specific cell, the multicast vector is modified to indicate only those output modules which failed to successfully process the specific cell, and the specific cell, the input modules ID and the modified retry vector are transmitted over the bus when the input module is selected at a subsequent time and discards the cell if no output module indicated a failure to process the cell.

22. In a multicast buffered switch including a plurality of input modules each connected to an input line over which transmission cells including data are received, a plurality of output modules each connected to an output line over which selected cells received at the input modules are to be retransmitted and a multiconductor bus interconnecting the input and output modules a method of transferring transmission cells received at an input module to selected output modules including the following steps:

at each of the input modules in a predetermined sequence placing on the bus a received transmission cell, an ID identifying the input module and a multicast vector which includes an indicia indicating to each of the outputs when a transmission cell on the multiconductor bus requires processing;

at each of the output modules examining the multicast vector and in response thereto comparing selected portions of the transmission cell and the ID placed on the multiconductor bus by the input modules to stored routing information for determining if the cell is to be transmitted by the output module over its connected output, queuing the cell for transmission over the connected output if selected and setting a unique assigned bit in a retry vector resident on the bus for indicating the successful or unsuccessful processing of a cell received on the bus; and, at each selected input module examining the retry vector to determine if any output modules failed to successfully process a specific cell, modifying the multicast vector to indicate only those output modules which failed to successfully process the specific cell and retransmitting the specific cell, the input modules ID and the modified retry vector when the input module is selected at a subsequent time and discarding the cell if no output modules indicate a failure to process the cell.

23. The method set forth in set forth in claim 22 in which the transmitted multicast vector identifies all of the output modules the first time a specific cell is transmitted on the bus.

24. In a multicast buffered switch which includes a plurality of input modules each connected to a different one of a plurality of input lines over which transmission cells including a payload are received, a plurality of output modules each connected to a different output line and a multiconductor bus for interconnecting the input and output modules a method for operating the switch including the following steps:

at each said input module;
receiving transmission cells, adding a unique ID to the received cells and storing the updated received cells,
sequentially selecting the input modules and at each selected input module placing a stored received cell and a multicast vector which includes a unique indicia indicating when a cell requires processing by an output module on the bus, At each said output module;
examining the multicast vector to determine if the output module is required to process the cell, if required comparing a portion of the cell to a locally stored routing table to determine if the cell is to be routed to the connected output line and entering a predetermined status indicia in a retry vector resident on the bus when the output module is unable to process a cell required to be transmitted on its connected output; and, at said input module;
examining said retry vector, modifying the multicast vector to indicate only those output modules which set a predetermined status in the retry vector, and placing that cell and the modified multicast vector on the bus when selected at a later time and discarding the cell when no output modules have set the predetermined status in the retry vector.

25. In a multicast buffered switch including a plurality of input modules (IM's) each connected to an input line over which transmission cells each including a header and a payload are received, a plurality of output modules (OM's) each connected to an output line over which selected cells received at the input modules are to be re transmitted with a modified header, and a multiconductor bus interconnecting the IM and OM modules and having an arbitration means for periodically generating unique bus selection signals for sequentially selecting the IM's a method for operating the switch including the following steps;

at each of the IMs receiving the cells, adding a unique ID identifying the input module to the header and storing the modified cells in a FIFO buffer, and responsive to a predetermined periodic selection signal from the arbitration means generating a multicast vector which includes an indicia indicating to each of the outputs when a transmission cell requires processing on the multiconductor bus and placing the multicast vector and the modified cell header of the oldest stored cell in the FIFO buffer on the bus when selected and the payload associated with that cell on the bus in the next subsequent bus period; and, at each of the OM's examining the multicast vector to determine if the OM is to process the cell on the bus and comparing selected portions of the header to stored routing information to determine if the cell being processed is to be retransmitted by the OM over its connected output and selecting and storing the payload on the bus in the next period and a new header for retransmission at a later time when the cell is selected for processing.

26. The method set forth in claim 25 in which the multicast vector identifies all of the OM's the first time a specific cell is placed on the bus.

27. The method set forth in claim 26 in which each of the OM's sets a unique assigned position in a retry vector resident on the bus in the bus period immediately following the period including the header for indicating the successful processing of a cell received on the bus.

28. The method set forth in claim 27 in which a selected IM examines the retry vector in the bus period which includes the cell payload to determine if any output modules failed to successfully process a specific cell, modifies the multicast vector to indicate only those output modules which failed to successfully process the specific cell and retransmits the specific cell and the modified retry vector when the input module is selected at a subsequent bus period and discards the cell if no output modules indicate a failure to process the cell.

29. In a multicast buffered ATM switch including a plurality of input modules each connected to an input line over which transmission cells each including a header and a payload are received, a plurality of output modules each connected to an output line over which selected cells received at the input modules are to be retransmitted a multiconductor bus interconnecting the input and output modules and a bus arbitration means for periodically generating unique bus selection signals for sequentially selecting the input modules a method for operating the switch including the following steps:

at each of the input modules storing received transmission cells in a FIFO buffer and replacing the header error correction (HEC) byte included in the received ATM cell header with a unique ID identifying the input module, generating a multicast vector which includes a unique indicia for indicating to each of the output modules when a transmission cell on the multiconductor bus requires processing, and responsive to a predetermined unique periodic bus selection signal placing the modified header and the multicast vector on predetermined positions in the multiconductor bus and the cell payload in predetermined positions in the bus in the very next bus period; and, At each of the output modules examining the multicast vector in each bus period to determine if the output module is required to process the cell, comparing selected portions of the modified header on the multiconductor bus to stored routing information for determining if that cell is to be retransmitted by the output module over its connected output, swapping the cell header if the output module is required to retransmit the cell over the connected output, setting a unique assigned position in a retry vector resident on the bus for indicating the successful or unsuccessful processing of a cell received on the bus, and inserting the swapped header and the payload on the bus in the next bus period in a retransmission queue for subsequent transmission; and at each selected input module examining the retry vector to determine if any output modules failed to successfully process a specific cell, modifying the multicast vector to indicate only those output modules which failed to successfully process the specific cell and resubmitting the specific cell with the modified multicast vector on the bus when the input module is next selected.

30. The method Set forth in claim 29 in which the input module sets the multicast vector to indicate all output modules the first time a received cell is placed on the bus and discards the cell when the retry vector indicates that no output modules signaled an inability to successfully process a cell and selects the next cell in the FIFO buffer for retransmission.

31. A multicast buffered switch comprising:

a plurality of input modules (IM's) each connected to an input line over which transmission cells each including a header and a payload are received;

a plurality of output modules (OM's) each connected to an output line over which selected cells received at the IM's are to be re transmitted with a modified header;

a multiconductor bus interconnecting the IM and OM modules, said bus including an arbitration means for periodically generating unique bus selection signals for sequentially selecting the IM's;

each of the IM's including a first IM means for receiving the cells, adding a unique ID identifying the input module to the header and storing the modified cells in a FIFO buffer, and second IM means responsive to a predetermined periodic selection signal from the arbitration means for placing the modified cell header of the oldest stored cell in the FIFO buffer and a multicast vector which includes an indicia indicating to each of the outputs when a transmission cell on the multiconductor bus requires processing and the payload associated with that cell on the bus in the next subsequent bus period; and, each of the OM's includes first OM means for examining the multicast vector to determine if the OM is to process the cell on the bus and second OM means for comparing selected portions of the header to stored routing information for determining if the cell being processed is to be retransmitted by the OM over its connected output and third OM means responsive to the second OM means for selecting and storing the payload on the bus in the next period and a new header for retransmission at a later time.

32. A multicast buffered switch as set forth in claim 31 in which the multicast vector identifies all of the OM's the first time an input module places a specific cell on the bus.

33. A multicast buffered switch as set forth in claim 32 in which each of the OM's includes a fourth OM means for setting a unique assigned position in a retry vector resident on the bus in the bus period immediately following the period including the header for indicating the successful processing of a cell received on the bus.

34. A multicast buffered switch as set forth in claim 33 in which a selected IM includes a third IM means for examining the retry vector in the bus period which includes the cell payload to determine if any output modules failed to successfully process a specific cell, modifies the multicast vector to indicate only those output modules which failed to successfully process the specific cell and retransmits the specific cell and the modified retry vector when the input module is selected in a subsequent bus period and discards the cell if no output modules indicate a failure to process the cell.

35. A multicast buffered ATM switch comprising:

a plurality of input modules each connected to an input line over which transmission cells including data are received;

a plurality of output modules each connected to an output line over which selected cells received at the input modules are to be retransmitted;

a multiconductor bus interconnecting the input and output modules, said bus including an arbitration means for periodically generating unique bus selection signals for sequentially selecting the input modules;

each of the input modules including first means for storing received transmission cells each of which includes a header and a payload in a FIFO buffer and for replacing the header error correction (HEC) byte included in the received ATM cell header with a unique ID identifying the input module, second means for generating a multicast vector which includes an indicia for indicating to each of the output modules when a transmission cell on the multiconductor bus requires processing, and third means responsive to a predetermined unique bus selection signal for placing the modified header and the multicast vector on predetermined positions in the multiconductor bus when selected by the arbitration means arid the cell payload in predetermined positions in the bus in the very next bus period; and, each of the output modules including first means responsive to the multicast vector in each bus period for comparing selected portions of the modified header on the multiconductor bus to stored routing information for determining if that cell is to be retransmitted by the output module over its connected output, second means for swapping the cell header if the output module is required to retransmit the cell over the connected output, third means for setting a unique assigned position in a retry vector resident on the bus for indicating the successful or unsuccessful processing of a cell received on the bus, and fourth means inserting the swapped header and the payload on the bus in the next bus period in a retransmission queue for subsequent transmission; and, each selected input module second means examining the retry vector to determine if any output modules failed to successfully process a specific cell, modifying the multicast vector to indicate only those output modules which tailed to successfully process the specific cell and resubmitting the specific cell with the modified multicast vector on the bus when the input module is next selected.

36. The multicast buffered ATM switch set forth in claim 35 in which the second means of the input module sets the multicast vector to indicate all output modules the first time a received cell is placed on the bus and discards the cell when the retry vector indicates that no output modules signaled an inability to successfully process a cell and selects the next cell in the FIFO buffer for retransmission.

* * * * *